US006839072B2

United States Patent
Trajkovic et al.

(10) Patent No.: US 6,839,072 B2
(45) Date of Patent: Jan. 4, 2005

(54) METHOD AND SYSTEM AND ARTICLE OF MANUFACTURE FOR DISPLAY OF OPTION RECOMMENDATIONS THROUGH TIME-BY-SCORE

(75) Inventors: Miroslav Trajkovic, Ossining, NY (US); Kaushal Kurapati, Yorktown Heights, NY (US); Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 503 days.

(21) Appl. No.: 09/882,894

(22) Filed: Jun. 15, 2001

(65) Prior Publication Data

US 2002/0191030 A1 Dec. 19, 2002

(51) Int. Cl.[7] .................................................. G09G 5/00
(52) U.S. Cl. ........................ 345/811; 345/810; 345/811; 345/821; 345/825; 345/844; 725/39; 725/44; 725/46; 725/52
(58) Field of Search ................................. 345/834, 810, 345/854, 811, 812, 821, 822, 825, 814, 844, 816, 719–721, 765, 866; 725/39, 44, 46, 52

(56) References Cited

U.S. PATENT DOCUMENTS

| | | | |
|---|---|---|---|
| 4,775,935 A | * 10/1988 | Yourick | 345/811 |
| 5,541,738 A | 7/1996 | Mankovitz | 358/335 |
| 5,576,755 A | 11/1996 | Davis et al. | 348/13 |
| 5,815,145 A | 9/1998 | Matthews, III | 345/327 |
| 5,818,541 A | 10/1998 | Matsuura et al. | 348/565 |
| 5,848,396 A | 12/1998 | Gerace | 705/10 |
| 5,943,678 A | 8/1999 | Hocker et al. | 707/511 |
| 5,977,974 A | 11/1999 | Hatori et al. | 345/349 |
| 5,991,735 A | 11/1999 | Gerace | 705/10 |
| 6,005,597 A | * 12/1999 | Barrett et al. | 725/46 |
| 6,020,883 A | * 2/2000 | Herz et al. | 345/721 |
| 6,128,009 A | 10/2000 | Ohkura et al. | 345/327 |
| 6,147,714 A | 11/2000 | Terasawa et al. | 348/564 |
| 6,160,570 A | * 12/2000 | Sitnik | 725/9 |
| 6,163,316 A | 12/2000 | Killian | 345/327 |
| 6,172,674 B1 | 1/2001 | Etheredge | 345/327 |
| 6,212,297 B1 | 4/2001 | Sklarew | 382/189 |
| 6,212,474 B1 | 4/2001 | Fowler et al. | 701/211 |
| 6,216,129 B1 | 4/2001 | Eldering | 707/10 |
| 6,546,002 B1 | * 4/2003 | Kim | 370/351 |
| 6,651,253 B2 | * 11/2003 | Dudkiewicz et al. | 725/114 |

* cited by examiner

*Primary Examiner*—Ba Huynh
*Assistant Examiner*—Cuong T. Thai
(74) *Attorney, Agent, or Firm*—Michael E. Belk

(57) ABSTRACT

A system, method, and article of manufacture is disclosed suitable for displaying selectable time orderable options, such as television programs available for viewing on a television, using a tunnel interface. The tunnel interface displays concentric rings where each ring represents a different set of option data whose attributes are modified to reflect a user's preferences. The modified option data are further arranged such that each concentric ring is ordered by time. Additionally, choices within each ring are visually distinguishable by user preference. Users can navigate within and between the concentric rings and select one or more of the available options using the concentric rings.

16 Claims, 2 Drawing Sheets

METHOD AND SYSTEM AND ARTICLE OF MANUFACTURE FOR DISPLAY OF OPTION RECOMMENDATIONS THROUGH TIME-BY-SCORE

BACKGROUND OF THE INVENTION

1. Field of the Invention

The present invention relates to the field of visual representation of information for human decision making. In particular, the present invention relates to the field of displaying information spatially in concentric rings such that selected attributes of the information are visually distinguished. In further particularity, the present invention relates to the field of displaying time orderable data such as television programs available for viewing in a time ordered spatial arrangement of concentric rings, each available program in a ring being visually distinguishable over other available time orderable data in that ring based on a user's preferences such as a user's television program viewing preferences.

2. Description of the Related Art

Current so-called recommender systems use user profiles to generate viewing recommendations depending on who is using the system, e.g. who is watching television. These recommender systems display viewing choices available to the user in numerous ways.

A presentation of recommendations of time orderable options from a set of selectable options wherein certain of the options may be more preferable to a user than others based on the user's preferences. The presentation uses option data including attributes, the option data attributes have descriptions of the option data with a time of availability of each option datum. The user profile provides attributes describing option selection preferences for a user, the option selection preferences includes the user's recommendation preferences for one or more option data, and visual display preferences for option data matching the user's recommendation preferences. A data store contains the profile and the option data. A match is made with a first predetermined set of profile attributes comprising the user's recommendation preferences to a corresponding first set of option data attributes. A display of concentric rings is used as a selector to displays option data that has been modified, the selector is programmed to a second predetermined set of option data attributes to correspond to a second predetermined set of profile attributes comprising the user's visual display preferences for each option datum matched.

In some prior art, currently available programming is displayed such as in a sub-picture, often referred to as "picture-in-a-picture." U.S. Pat. No. 5,818,541 issued to Matsuura et al. is illustrative. In Matsuura '541, a television enters into a program scanning mode and sequentially displays a plurality of images that show available programming. U.S. Pat. No. 6,147,714 issued to Terasawa et al is similar and allows for selection of a desired option from a set of reduced-sized still pictures of program viewing options. There is no teaching or suggestion in either patent to show program selection options for more than the currently available programming, user preferences, or ordering of options using the user preferences.

Some prior art recognizes that users may have preferences about the options available to them. U.S. Pat. No. 6,172,674 issued to Etheredge is illustrative. In Etheredge '674, a television viewer can access and interact with television scheduling information using an electronic program guide that uses a grid to show channels, titles, and show times. The guide can filter the data prior to display but will only display data that meets certain filter criteria. There is no suggestion or teaching in Etheredge '674 to arrange the data in concentric rings, time order the data by the rings, or allow for multiple users, each having a predetermined set of option selection preferences.

U.S. Pat. No. 6,128,009 issued to Ohkura et al. is further illustrative of menu systems for presenting television viewing option guides. In Ohkura '009, program viewing choices are displayed in a tabular format.

One method of displaying options to a user is referred to as a "tunnel" interface comprising concentric rings of displayed data, each ring representing a different set of attributes. The recommender systems of the prior art that use such tunnel interfaces order the program data in each ring, as well as the rings themselves, by a weighting system wherein recommendations having higher "weights" or "scores" appear on outer rings while those with lower weights appear on successively diminished inner rings.

A problem with tunnel interfaces is that the user can become disoriented with respect to the time element of the program data being displayed. These recommendations do not account for a time dimension, e.g. having the time that the program is available for viewing spatially consistent with other programs of that same time and spatially different from other programs in other time frames. Moreover, it is possible that a given set of programs available for viewing at the same time may appear in different concentric rings.

DETAILED DESCRIPTION OF THE PREFERRED EMBODIMENT

In general, throughout this description, if an item is described as implemented in software, it can equally well be implemented as hardware.

It is further understood that, although the exemplary embodiment described herein relates to a television and television programs available for viewing, the present invention is not limited to television programs available for viewing and may be used to present time orderable option data on a display where the option data are sortable by time and each option within a given time frame may be distinguishable over other options in that time frame depending on a user's preferences.

Figure 1:
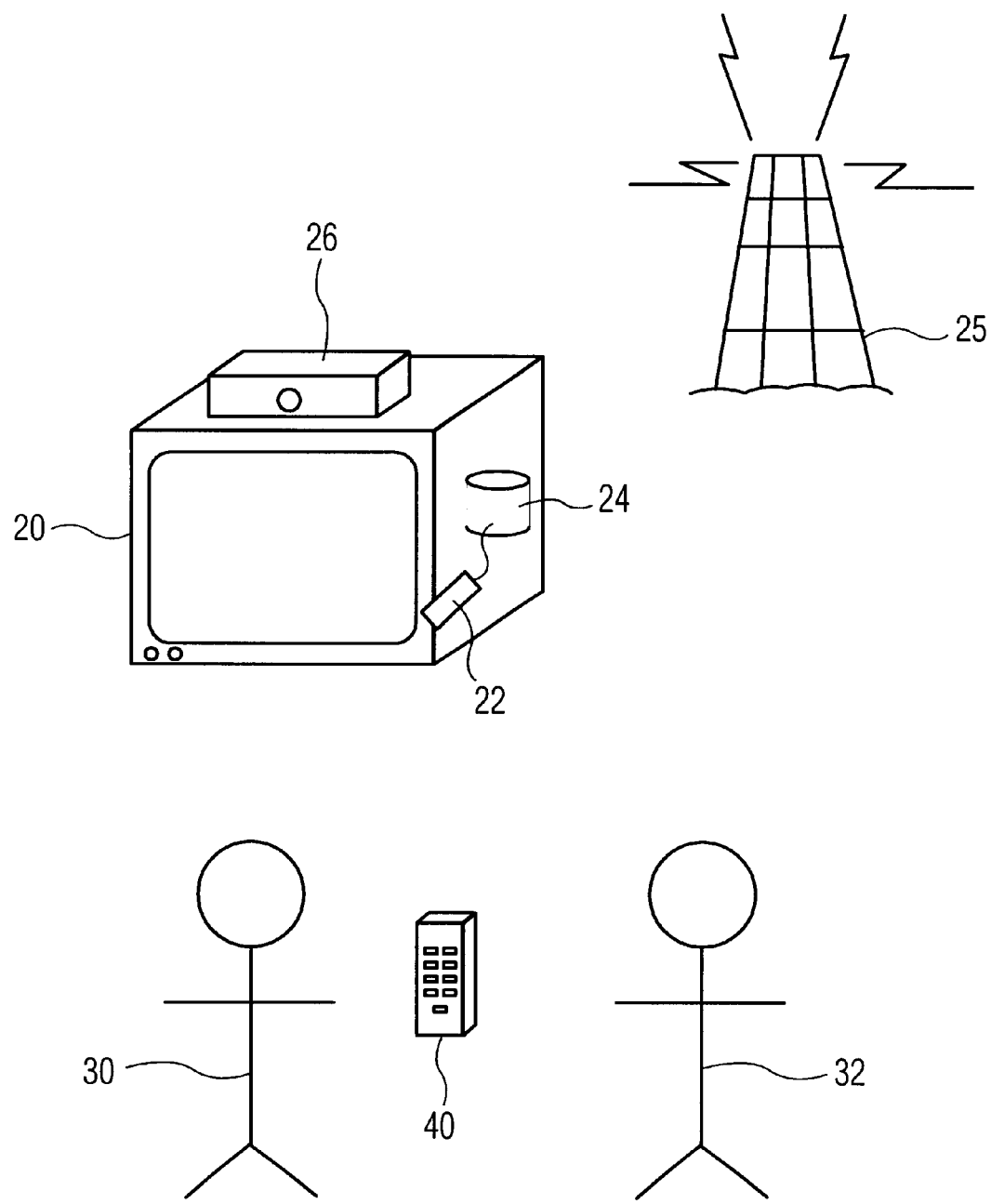
FIG. 1 is a schematic representation of an embodiment of the present system.

Referring now to FIG. 1, television 20 obtains user preferences from users, such as user 30. User 30 may create and maintain a user profile comprising the various preferences for that user, by way of example and not limitation including time of day limitations, weightings or rank ordering of types of programs desirable to the user 30, and the like. These user profiles may be created and/or maintained through a selection device such as a handheld remote device 40, e.g. a television remote control device, or through other devices such as personal computers for transmission to television 20 such as via a data communications link (not shown in FIG. 1), by way of example and not limitation an IEEE 1394 FireWire™ link, an ethernet connection to a local area network, a universal serial bus (USB) link, an infrared link, or the like, or any combination thereof.

Additionally, television 20 comprises a display for displaying visual images.

As used herein, "television 20" is one type of selector 20. As used herein, "selector" 20 is a device capable of processing the user profiles such as by having a processing unit 22 available to a television 20. Thus, as used herein, whenever "television 20" is referred to as processing data, it is understood that selector 20 comprises at least one television 20 and at least one processing unit 22. Although a preferred embodiment of selector 20 incorporates processing unit 22 in a television 20, selector 20 need only be operatively linked to processing unit 22 as described above. Further, as used herein with respect to "television 20," "show" or "program" comprises commercial television, private non-commercial broadcast television, cable television, satellite television, Internet television, and the like, or any combination thereof.

Processing unit 22 may be a microprocessor or specialized circuit built into television 20, a separate processing unit connected to television 20 such as a so-called set top box, or a processing unit such as a personal computer operatively linked to television 20, as will be familiar to those of ordinary skill in the computer arts.

Television 20 has access to persistent memory store 24 on which the user profiles are stored. Persistent memory store 24 may be RAM, NVRAM, flash ROM, hard drive, diskette drive, or the like, or a combination. Persistent memory store 24 may be a part of television 20 or accessible to television 20 such as through a data communications link (not shown in FIG. 1). Processing unit 22 is capable of retrieving data from persistent memory store 24 and manipulating that data.

Television 20 receives program information, by way of example from broadcaster 25, the program information comprising attributes which can be matched, in whole or in part, to attributes of the user preferences stored in the user profiles.

When television 20 is powered on, television 20 determines the identity of the user 30 who powered on television 20. The method for detecting of the identity of the user 30 may be by use of a personal identification number entered via remote device 40 or by a biometric device as will be familiar to those of ordinary skill in the biometric detection arts including biometric devices having recognition abilities such as by face, body, or voice recognition through a camera or voice device 22 either built into television 20 or operatively connected to television 20, fingerprint, or the like, or a combination thereof.

Once the identity of the user 30 is determined, the profile for the user 30 is retrieved from persistent memory store 24. If the user 30 cannot be or is not identified or if the identified user 30 has no profile, a default profile may be used. Television 20 further determines if current program information is available. If current program information is not available, television 20 retrieves current program information using program information retrieval methods familiar to those of ordinary skill in the television arts. Television 20 then compares the profile for user 30 against the television program information available to television 20 and prepares a set of viewing recommendations for the user 30 to be displayed to user 30.

Figure 2:
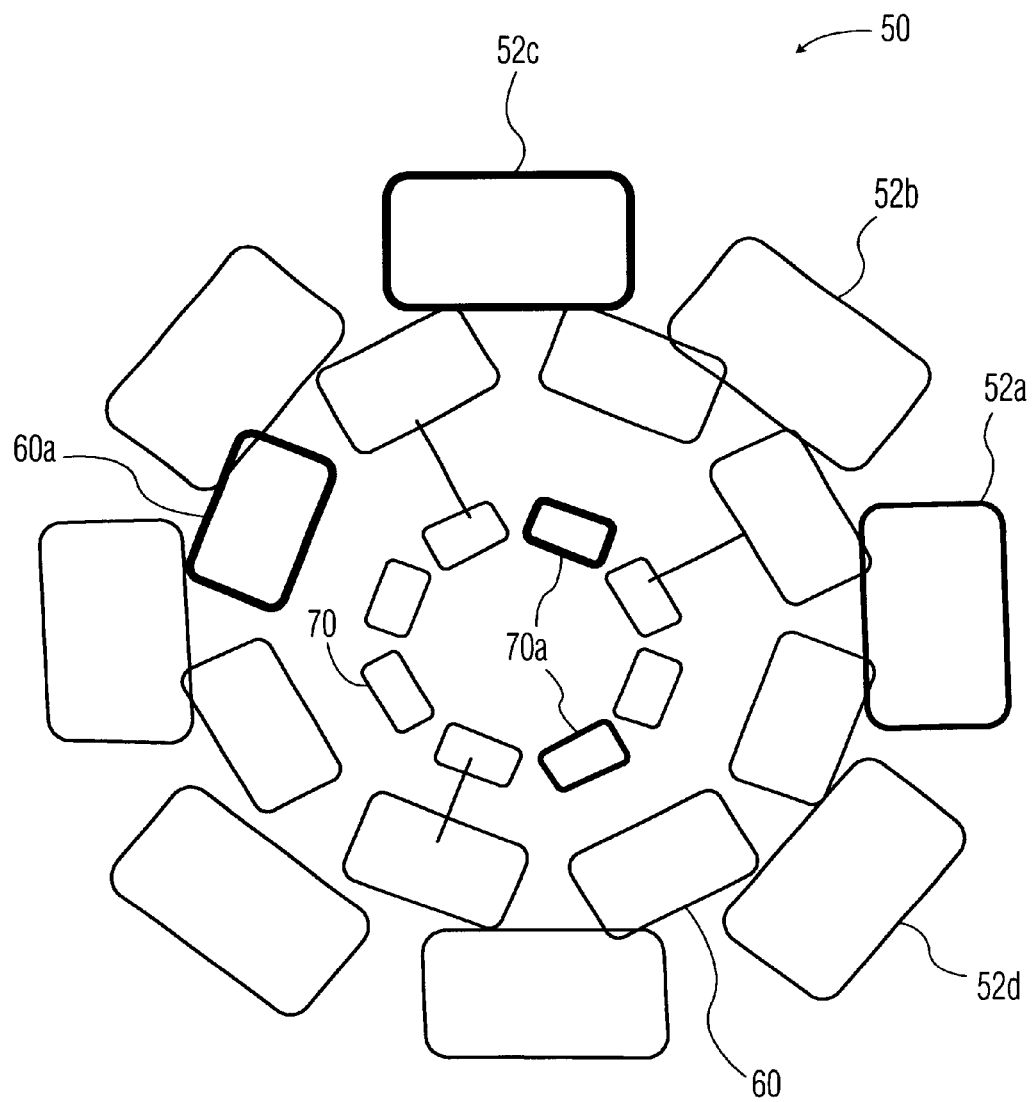
FIG. 2 is a schematic representation of an embodiment of a tunnel display.

Referring now to FIG. 2, television 20 displays the recommendations for user 30 by creating a first ring, generally referred to as "50," comprising information about programs, of which television 20 is aware, where the programs are the programs currently available for viewing or are to be broadcast within the current time frame. As used herein, "time frame" means the current time zone clock time as aligned on a predetermined boundary such as half-hour or hour. For each successive time frame for which program information is available to television 20, a separate ring is created comprising information about programs for those successive time frames, such as rings 60 and 70. Each ring is then displayed on television 20 such that the most current ring 50 is displayed to appear larger and closer to the user 30, and each successive ring such as rings 60 and 70 are made to appear smaller and successively further away from the user. All rings may be made to appear to have a common center or may be offset.

Within each ring, programs which more closely agree with the preferences of the user 30 may be made to appear visually different than other programs in the ring. Multiple degrees of appearance may be used to achieve the visual differences, by way of example and not limitation including shading, borders, transparency, font used, and the like, or any combination thereof.

Additionally, programs within a ring, referred to herein as "ring members," may be presented in a predetermined manner such as by sorting where the most preferable programs for viewing are presented as if on top of a ring and those less desirable on the bottom of the ring. Additionally, programs may be sorted by other criteria within a ring, by way of example and not limitation such as by channel number, program title, program category, or the like, or any combination thereof.

Users 30 may further use a selection device such as remote device 40 to navigate between rings and within a ring as well as to make a program selection from a ring member.

Users 30 may also activate a selected ring to act as a secondary display on television 20 much like a picture-in-a-picture display, and use the secondary display to preview programs. By way of example and not limitation, if user 30 wants to browse through the recommendations but also wants to monitor a particular show, the area of the television in which the show is displayed will then act as the picture-in-a-picture display such as by being rendered opaque yet visible.

In an exemplary embodiment, user 30 powers on television 20. Upon power on, television 20 determines the identity of user 30 such as by using biometric scanner 26 to recognize user 30 or by obtaining input of a user identifier such as a number entered via remote control 40. Once the identity of user 30 has been established, television 20 obtains the profile for user 30 from persistent memory store 24. If there is no user profile, e.g. user 30 is not identified or is new to television 20, the system may obtain and use a default profile.

Television 20 then verifies that current program information is available to television 20, such as program information available to television 20 from broadcaster 25. If not, television 20 retrieves current program information using program information retrieval methods familiar to those of ordinary skill in the television arts. Using profile information data, television 20 creates data structures representing rings wherein the program information data are distinguishable by time of program viewing availability. Each ring thus comprises program information for programs available for viewing to user 30 within a predetermined time frame, in the preferred embodiment each ring representing a single time frame aligned on a predetermined time boundary such as hourly or half-hourly.

Once the program information data are gathered, television 20 sorts the program data by time of availability.

Television 20 then uses data from the user profile to change selected attributes of the program information data contained in each ring. In a preferred embodiment, programs within a ring that more closely match the profile of user 30, e.g. are more preferable to that user 30, are made to appear brighter whereas those less preferable to that user 30 are made to appear dimmer. In a currently contemplated embodiment, additional visual attributes may also be manipulated or may be manipulated instead of brightness to indicate a greater match to the preferences of user 30, by way of example and not limitation including increasing opacity of the more preferable programs in a ring while increasing the transparency of the less preferable programs in a ring, color, presence or absence of borders, font, and the like, or combinations thereof. In this way, preferences may be grouped within a ring as well as distinguished within a ring.

By way of example and not limitation, as shown in FIG. 2, differing border thicknesses may be used to distinguish options within a ring. In FIG. 2, using border thickness program 52c is marked as being more preferable in its time frame than program 52a, which is more preferable than program 52b, which is more preferable than the rest of the programs available in that time frame described by ring 52, such as program 52d in ring 52. Similarly, program 60a is more preferable in ring 60, and program 70a in ring 70, for those time frames.

Additionally, users 30 may be permitted to vary the onscreen time frame of a given ring. By way of example and not limitation, ring 50 may initially represent programs and recommendations for viewing that are currently available. By using a selection device such as remote device 40, user 30 can change the time frame of ring 50, e.g. advance it one hour. In a currently considered embodiment, user 30 can change time frames by selecting an different ring, e.g. selecting ring 60 will make ring 60 the most prominent ring, making ring 50 no longer visible and advancing all other rings, e.g. ring 70.

User 30 may further select a given program within a ring, e.g. program 52c, for current viewing. In a currently envisioned embodiment, user 30 may also select other programs for later viewing, e.g. program 60a, such that television 20 switches viewing from the currently viewed programming to the next program, e.g. 60a, when the next program becomes available for viewing.

Although the exemplary preferred embodiment described above relates to a television and television programs available for viewing, the present invention is not limited to televisions and television programs available for viewing. The present invention may be used with where time-orderable options exist in which certain options are more preferable to a user than others, by way of example and not limitation such as to allow a child to select a given set of options available to the child such as in a token economy behavioral modification system or to allow a listener to select different radio programs for listening.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for presentation of recommendations of time orderable options from a set of selectable options wherein certain of the options may be more preferable to a user than others based on the user's preferences, comprising:

a. option data comprising attributes, the option data attributes comprising descriptions of the option data, at least one description comprising a time of availability of each option datum;

a. at least one user profile comprising attributes describing option selection preferences for a user, the option selection preferences comprising:
  i. the user's recommendation preferences for one or more option data; and
  ii. visual display preferences for option data matching the user's recommendation preferences;

b. a persistent data store containing the at least one profile and the option data;

d. a display; and e. a selector, the selector programmed to:
  i. match a first predetermined set of profile attributes comprising the user's recommendation preferences to a corresponding first set of option data attributes;
  ii. modify a second predetermined set of option data attributes to correspond to a second predetermined set of profile attributes comprising the user's visual display preferences for each option datum matched;
  iii. create a set of concentric rings, each ring representing the option data as modified, each ring further corresponding to a predetermined time frame; and
  iv. display the set of concentric rings on the display.

2. The system of claim 1 further comprising an input device capable of identifying at least one user, wherein the selector is further programed to:
  v. acquire an identity of the user via the input device; and
  vi. acquire a profile from the persistent data store for the user so identified.

3. The system of claim 2 wherein the selector acquires a profile matching the user for users with matching profiles and a default profile for users who do not have matching profiles.

4. The system of claim 2 wherein the input device is a television remote control.

5. The system of claim 2 wherein the selector is further programmed to:
  v. allow the user to navigate between the concentric rings using the input device; and
  vi. accept the user's selection of an option from the displayed concentric rings using the input device.

6. The system of claim 1 wherein:
a. the display is a television; and
b. the option data are data describing television programs available for viewing.

7. The system of claim 1 wherein the selector is selected from the group of selectors consisting of microprocessors embedded within a television, application specific integrated circuits embedded within a television, set top boxes operatively connected to a television, and external computers operatively connected to a television.

8. The system of claim 1 wherein the persistent data store is a plurality of persistent data stores, each operatively connected to the selector.

9. The system of claim 1 wherein the second predetermined set of attributes within the option data are selected from the set of attributes consisting of brightness, contract, opacity, color, borders, font, and combinations thereof.

10. A system for presentation of recommendations of time orderable options from a set of selectable time orderable options wherein certain of the options may be more preferable to a user than other options, based on the user's preferences, the system comprising:

a. a first storage means for retrievably storing option data, the option data comprising attributes, the option data attributes comprising descriptions of options wherein at least one attribute describes a time of availability for each datum;

b. a second storage means for retrievably storing at least one profile comprising attributes describing option selection preferences for a user, the option selection preferences comprising:
   i. the user's option recommendation preferences; and
   ii. the user's visual display preferences for option data matching the user's option recommendation preferences;

c. input means capable of identifying at least one user;

d. a display; and e. selector means for
   i. acquiring an identity of the user via the input means;
   ii. acquiring the profile from the second storage means for the user so identified;
   iii. matching a first predetermined set of option recommendation preference attributes within the profile with a corresponding first set of attributes within the option data;
   iv. modifying a second predetermined set of attributes within the option data to correspond to a second set of visual display preferences attributes within the profile;
   v. creating a set of concentric rings, each ring representing the modified second predetermined set of attributes within the option data; and
   vi. displaying the set of concentric rings on the display.

11. The system of claim 10 wherein the selector means further comprises:
   i. means for allowing the user to navigate between the concentric rings using the input means; and
   ii. means for accepting the user's input of an option from the displayed concentric rings.

12. A method for presentation of recommendations of time orderable options from a set of selectable time orderable options wherein certain of the options may be more preferable to a user than other of the options, based on the user's preferences, the method comprising:
   a. acquiring an identity of a user via an input device;
   b. acquiring a profile from a persistent data store for the user so identified, the profile comprising user modifiable attributes, the user modifiable attributes comprising:
      i. the user's option recommendation preferences; and
      ii. the user's visual display preferences for option data matching the user's recommendation preferences;
   c. matching a first predetermined set of option recommendation preference attributes within the profile with a corresponding first set of attributes within the option data;
   d. modifying a second predetermined set of attributes within the option data to correspond to a second set of visual display preferences attributes within the profile;
   e. creating a set of concentric ring data structures, each concentric ring data structure representing the modified second predetermined set of attributes within the option data; and
   f. displaying a set of concentric rings, described by the concentric ring data structures, on a display.

13. The method of claim 12 further comprising:
   g. allowing the identified user to navigate between the concentric rings using the input device; and
   h. accepting the identified user's input of an option from the displayed concentric rings using the input device.

14. The method of claim 12 wherein the option data describe television programs.

15. The method of claim 12 performed within a computer program embodied within a computer-readable medium.

16. An option recommendation display system stored via a data storage medium, comprising:
   a. first plurality of binary values for receiving a set of time orderable option data, the time orderable option data comprising attributes, the attributes comprising descriptions embodied within each datum of the option data, at least one attribute being a time of availability for the time orderable option datum;
   b. a second plurality of binary values for storing at least one user profile comprising attributes describing user option recommendation preferences;
   c. a third plurality of binary values for creating a set of data structures, the data structures comprising a predetermined set of the option data modified by a predetermined set of the user option recommendation preferences in the user profile; and
   d. a fourth plurality of binary values useful for displaying the set of data structures as a set of concentric rings.

* * * * *